United States Patent [19]

Hammon, III et al.

[11] Patent Number: 6,037,715
[45] Date of Patent: Mar. 14, 2000

[54] SPARK SWITCH HAVING COAXIAL ELECTRODES WITH INCREASED ELECTRODE SURFACE AREA EXPOSURE

[75] Inventors: H. George Hammon, III, Orinda; Michael Wright Ingram, San Leandro; David Vincent Drury, Livermore; John Tom Naff, Pleasanton; Ronald Stanley Shaw, San Leandro, all of Calif.

[73] Assignee: Maxwell Technologies Systems Division, Inc., San Diego, Calif.

[21] Appl. No.: 08/971,882

[22] Filed: Nov. 19, 1997

[51] Int. Cl.⁷ .............................. H01J 17/04; H01J 61/06
[52] U.S. Cl. ............... 313/631; 313/231.41; 313/231.11; 315/326
[58] Field of Search ..................... 313/621, 622, 313/631, 632, 356, 120, 231.01, 231.11, 231.21, 231.31, 231.41, 231.51, 231.61, 231.71, 589, 146, 603, 240; 337/28, 34; 361/120, 605; 218/126, 5

[56] References Cited

U.S. PATENT DOCUMENTS

| | | |
|---|---|---|
| 3,471,733 | 10/1969 | Rich ........................................ 313/217 |
| 3,854,068 | 12/1974 | Rich . |
| 3,996,438 | 12/1976 | Kurtz et al. . |
| 4,029,921 | 6/1977 | Rich et al. . |
| 4,063,126 | 12/1977 | Rich et al. . |
| 4,126,808 | 11/1978 | Rich . |
| 4,503,414 | 3/1985 | Sykes et al. ............................. 337/31 |
| 4,924,346 | 5/1990 | Capps ..................................... 361/117 |
| 5,061,877 | 10/1991 | Akanuma ................................ 313/631 |
| 5,126,638 | 6/1992 | Dethlefsen ............................. 313/326 |
| 5,142,194 | 8/1992 | Jacubeit et al. . |
| 5,502,346 | 3/1996 | Hsieh . |

Primary Examiner—Vip Patel
Assistant Examiner—Matthew Gerike
Attorney, Agent, or Firm—Wiggin & Dana; Gregory S. Rosenblatt

[57] ABSTRACT

A geometry for a spark switch includes an inner electrode surrounded by an outer electrode. The placement of the inner electrode within the outer electrode substantially increases the exposed overlapping surface area of the electrodes. The increase in surface area of the electrodes results in a proportional increase in the operational life of the switch. The design of the spark switch also causes the outer electrode to shield a surrounding insulation layer against debris that would otherwise contaminate an insulation layer.

21 Claims, 6 Drawing Sheets

SPARK SWITCH HAVING COAXIAL ELECTRODES WITH INCREASED ELECTRODE SURFACE AREA EXPOSURE

BACKGROUND OF THE INVENTION

1. Field of the Invention

This invention relates to an electric switch to be used in power systems in excess of 1 kV. More particularly, a radial design increases the exposed electrode surface area by nesting an inner electrode in an outer electrode.

2. Description of the Art

Spark gap switches are used to control the discharge of high voltage energy storage capacitor banks, Marx impulse voltage generators, and other high voltage, high current power systems.

Conventional spark gap switches consist of two or more electrically conducting electrodes separated by a gas-filled region. Spark gap switches are used to hold off voltage until a desired voltage is reached and then the switch breaks down by the formation of an electrically conducting plasma. Conventional spark gap switches are often placed in an insulating housing so as to accommodate different gases and to allow changing the gas density.

Operation of spark gap switches results in erosion of the switch electrodes, thereby increasing the gap length. Electrode erosion is a function of current that has been passed through the electrodes and the length of time the current flows through the electrode. A particular switch configuration typically has an erosion rate measured in micrograms per coulomb of total charge transferred through the switch electrodes. (Total charge transfer is the cumulative time integral of the absolute value of the current passing through the switch.) A typical value for switch erosion is 100 to 200 micrograms per coulomb. In a particular circuit, the breakdown voltage of the switch is usually set by adjusting the pressure (density) of the switch gas dielectric, e.g. air or sulfur hexafluoride ($SF_6$).

Once the electrodes erode and the gap expands to a certain point, the breakdown voltage can no longer be adjusted to the desired value by changing the density of the switch gas. At that point, the switch is no longer operational.

In the design of a conventional axial-spark switch, insulating material is exposed to debris from sparking, which tends to contaminate the insulating material thereby reducing the operational life of the switch.

U.S. Pat. No. 5,502,346 (Hsieh) discloses an electrochemical generator to produce, for example, ozone. This apparatus uses an insulating tube inserted into a ground electrode tube.

U.S. Pat. No. 4,126,808 (Rich) discloses a high voltage two stage triggered vacuum gap with high voltage terminals at opposite ends of an envelope. Vacuum switches use plasma generators to inject plasma into the switch gap.

U.S. Pat. No. 3,996,438 (Kurtz) discloses a vacuum-type circuit interrupter with two pluralities of rod electrodes in which the first plurality of electrodes interleave with the second plurality of electrodes.

U.S. Pat. No. 3,854,068 (Rich) discloses a shield structure for vacuum arc discharge devices.

The Rich and Kurtz patents listed above are incorporated by reference in their entirety.

As can be seen from the present state of the art, there exists a need for a switch that can operate at voltages in excess of 1 kV where the switch operational lifetime exceeds a total charge transfer of one million Coulombs, particularly for continuous repetitive operation.

BRIEF SUMMARY OF THE INVENTION

The present invention increases the operational life of a spark switch by increasing the amount of exposed electrode surface area.

One embodiment of the present invention is directed to a spark switch having a first end plate and a second end plate. An inner electrode having an outer wall; and an outer electrode. Both the inner electrode and outer electrode are disposed between the first and second end plates and bonded thereto. The outer electrode defines a cavity for receiving a portion of the inner electrode, and the outer wall of the inner electrode and the cavity of the outer electrode form a radial gap.

An insulating material is disposed in a sleeve-like configuration around the outer electrode. The insulating material is protected against exposure to contaminants during switching because the outer electrode acts as a barrier to switching byproducts.

A second embodiment is directed to a coaxial switch that has electrodes connected to electrical connectors. An insulating material is at either end of the coaxial switch and there are means to maintain the position of the insulating material. This embodiment has a conducting tube connected to an electrical source and an electrical load to provide a path for return current from the load to the source.

A third embodiment is directed to a third electrode nested within the inner electrode and thereby forming an additional radial gap.

A fourth embodiment is directed to a switch having inlet and outlet ports so that accumulated debris may be removed.

DETAILED DESCRIPTION

Spark gap switches are often the most rugged switches available for high-peak-power systems. However, they are generally limited to less than 500,000 Coulombs of operational life, where one (1) coulomb is the charge transferred by the flow of a current of one (1) Ampere for one (1) second.

The operation of a spark gap switch produces spark breakdown current between the electrodes. Spark breakdown current is current flow between electrodes, which produces a hot plasma having gaseous, molten and solid debris as a byproduct. Spark breakdown current is detrimental to the surface of the electrodes and causes them to become pitted and eroded. Debris from the spark breakdown current also degrades any surrounding materials such as insulating materials used to hold the electrodes in place.

The present invention discloses a new and improved spark switch design that inserts an inner electrode into an outer electrode, thereby increasing the amount of material that can be eroded before changing the gap length, and thereby increasing the operational life of a switch. The design also enables the outer electrode to serve as a containment vessel thereby restricting the trajectory of debris caused by the breakdown current.

Figure 1:
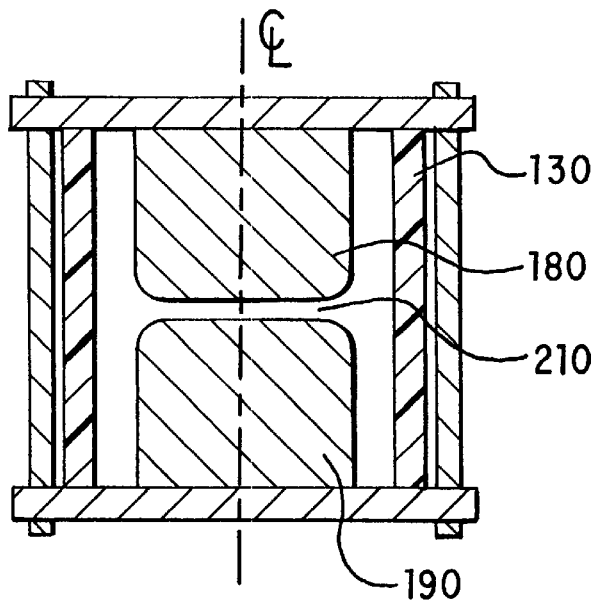
FIG. 1 is a side elevation cross-section of a conventional type axial-spark gap switch as known from the prior art.

FIG. 1 shows a conventional axial-spark switch 20. The exposed electrode surface area is limited to the exposure of an upper electrode plate 180 to a lower electrode plate 190.

The design of the two electrode plates 180, 190 exposes insulating material 130 that is typically acrylic, ceramic, or other insulating material surrounding the electrode plates 180, 190 to spark debris caused by spark breakdown. The gap 210 between electrode plates 180, 190 is typically filled with air or other suitable gas such as, sulfur hexafluoride ($SF_6$) or carbon dioxide ($CO_2$).

Figure 2:
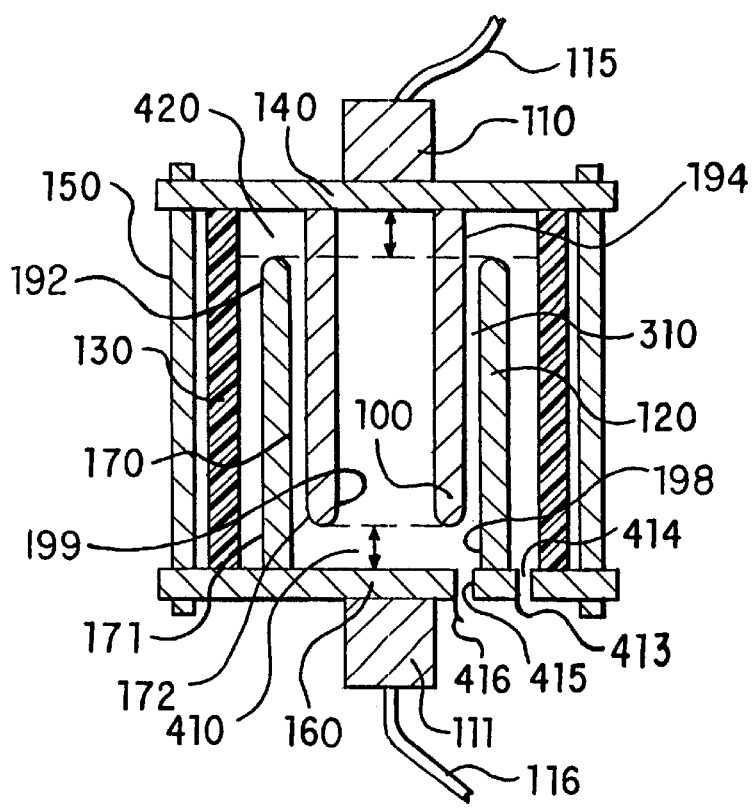
FIG. 2 is a side elevation cross-section of a spark switch constructed in accordance with this invention.
Figure 3:
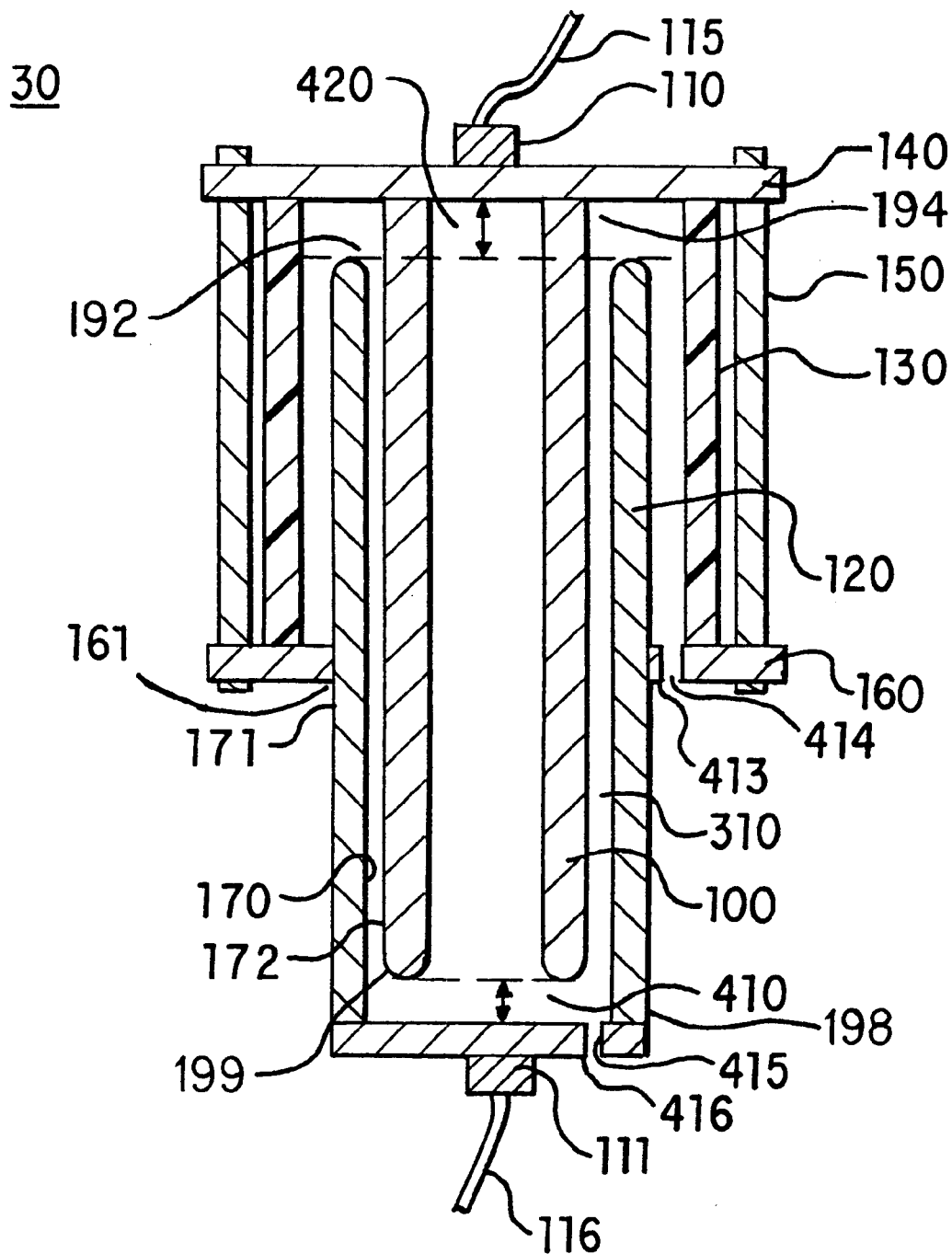
FIG. 3 illustrates an embodiment of the switch in which the electrodes are elongated.

In the spark switch of the invention, as illustrated in FIGS. 2 and 3, the surface area of the exposed electrodes is significantly increased by having an inner electrode 100, nested in, or surrounded by, an outer electrode 120. This nested configuration enables the exposed electrode surface area of inner electrode 100 and outer electrode 120 to have up to approximately five times the exposed electrode surface area of conventional axial-spark switches of the same overall volume.

The spark switch of the present invention also allows scaling to large electrode areas at constant switch diameter, without increasing the forces on tie rods 150. Increasing the electrode area of the conventional axial-switch requires increasing switch diameter, which causes higher stresses on the tie rods 150.

FIGS. 2 and 3 show a spark switch with end terminals 110, 111 connected to conductors 115, 116, at a first end plate 140 and a second end plate 160 of the switch respectively. The conductors 115, 116 enable the switch to be connected to an electrical power source (not shown) and an electrical load (not shown). The end plates can be made from steel, aluminum, or any strong conducting material. The first end plate 140 is affixed to the second end plate 160 via a plurality of tie rods 150 extending longitudinally between the first end plate 140 and the second end plate 160 of the switch 10. The tie rods may be made from strong-dielectric materials, such as nylon, fiberglass, or polycarbonate, which enables the tie rods 150 to securely hold the first end plate 140 and second end plate 160 together.

Current is passed through the terminal at the first end plate 140 that causes the switch to produce a spark breakdown current. The spark breakdown current flows from the inner electrode 100 to the outer electrode 120, across a gap 310 formed by the inner electrode 100 being nested in the outer electrode 120. The spark breakdown current is typically between 1,000 Amperes and 500,000 Amperes. The electrodes are nested such that the gap 310 is formed between the overlapping electrode surfaces. This gap 310 provides a path for the current to flow and may include air or other gas dielectrics such as sulfur hexafluoride ($SF_6$), carbon dioxide ($CO_2$), etc.

An insulating barrier 130 of rigid insulating material provides a pressure container for the spark switch, support for the electrodes and maintains electrical separation of the electrodes. The insulating barrier 130 may be hollow and may extend any portion of the length of the electrodes 100, 120. The composition of the insulating barrier 130 may be plastic, ceramic or any other material that has heat resistant and flame retardant properties. A preferred material is glass reinforced aliphatic resin as it is strong and char-resistant.

Outer electrode 120 comprises an electrically conductive material, such as brass, tungsten-copper alloy or high-strength carbon. A suitable material for the electrode is one that erodes uniformly and smoothly. The outer electrode 120 has an inner wall 170 and an outer wall 171. Outer electrode 120 has a terminal end portion 192 opposite the second end plate 160. The outer electrode 120 also has a proximal end portion 198 that is opposite the terminal end portion 192. The inner wall of the outer electrode 170 forms a longitudinal cavity of sufficient size to receive, in a mating fashion, the inner electrode 100.

The inner electrode 100 is made of an electrically conductive material, similar to the outer electrode 120, and inserted into the terminal end portion 192 of the outer electrode 120, as shown in FIGS. 2 and 3. The inner electrode is secured at proximal end 194 to the first portion of the switch 140, and has a terminal end portion 199 opposite the secured end. The inner electrode 100 has an outer wall 172.

The inner wall of the outer electrode 170, and outer wall of the inner electrode 172, define a radial gap region that provides a channel for spark breakdown current between the inner electrode 100 and outer electrode 120.

The radial gap region 310 may be comprised of air or any other composition that provides a medium for spark breakdown current to flow between the inner an outer electrodes 100, 120. The radial gap 310 may be between approximately 0.001 inch and 1 inch, preferably approximately 0.25 inches. The gap depends on the voltage present in the switch.

A formula that describes the general behavior of spark gap switches as a function of gas species, gap length, and gas density is given as equation 1.

$$V = kd + \beta(d)^{1/2} \qquad (1)$$

where V is the switch breakdown voltage, is the gas density, d is the gap length, and k and $\beta$ are constants depending on the type of gas. For example if is the density in atmospheres and d is in millimeters, for air, k is 2.45 and $\beta$ is 2.1. For sulfur hexafluoride ($SF_6$), another frequently used gas, k is 6.8 and $\beta$ is 7.5. This formula and graphs showing deviations from the formula are given in D.Legg, "Insulation Applied to Circuit Breakers," *Power Circuit Breaker Theory and Design*, Chapter 12, Edited by C. H. Flurscheim.

There is a terminal gap 410 that is formed between the terminal end portion of the outer electrode 120 and the terminal end portion of the inner electrode 100. The terminal gap 410 needs to be large enough to prevent a short circuit situation in the switch in the event of debris accumulation. The terminal gap may range from between 1 to 15 times the magnitude of gap 310.

As shown in FIGS. 2 and 3, a second terminal gap 420 is formed at the end of the switch opposite the first terminal gap 410. This second terminal gap 420 also prevents a short circuit situation in the switch. It has a similar range in size as the first terminal gap 410.

The terminal gaps 410, 420 tend to collect debris that accumulates during switching. Fluid, either gas or liquid, or a combination of both, can be injected through an inlet port 414 forcing debris out of the switch through outlet port 415 thereby preventing accumulated debris from decreasing the operational life of the switch 10. The inlet port 414 has a cover 413 that can be closed when there is no fluid being removed from the switch 10. Outlet port 415 also has a cover 416 that covers outlet port 415 when there is no fluid being injected into the switch 10.

An advantage of the present spark switch design is improved cleanliness of the insulating barrier 130. The placement of the outer electrode 120 over the inner electrode 100 acts to shield the insulating barrier material 130 from debris produced by switching activity. During switching, spark breakdown currents flow from the inner electrode 100 to the outer electrode 120 that produce ultra-violet radiation and molten and solid byproducts which tend to contaminate and degrade the insulating barrier material 130. The present inventive design prolongs the useful life of the insulating barrier 130 because the outer electrode 120 forms a sleeve-like barrier such that the insulating barrier 130 is not exposed to the byproducts and debris that result from the arcing currents produced when switching activity occurs.

FIG. 3 shows the spark switch 30 with elongated cylindrical electrodes 100, 120. The operational life of the switch can be increased by further increasing the surface area of the electrodes 100, 120. This is accomplished in one embodiment by increasing the length of the inner and outer electrodes 100, 120 along their longitudinal axes. The length of both the inner electrode 100 and outer electrode 120 is increased, which therefore increases the exposed surface area of the electrodes. The second end plate 160 in this elongated embodiment has a cavity or radial opening 161 that permits the nested electrodes 100, 120 to extend beyond the second end plate 160.

As shown in FIG. 3, the inner electrode 100 may be a hollow cylinder with electrode plates on the exterior of the cylinder.

The elongated electrode design as depicted in FIG. 3 has the additional advantage that the larger surface area provides increased dissipation of heat generated during spark breakdown current flow.

Figure 4:
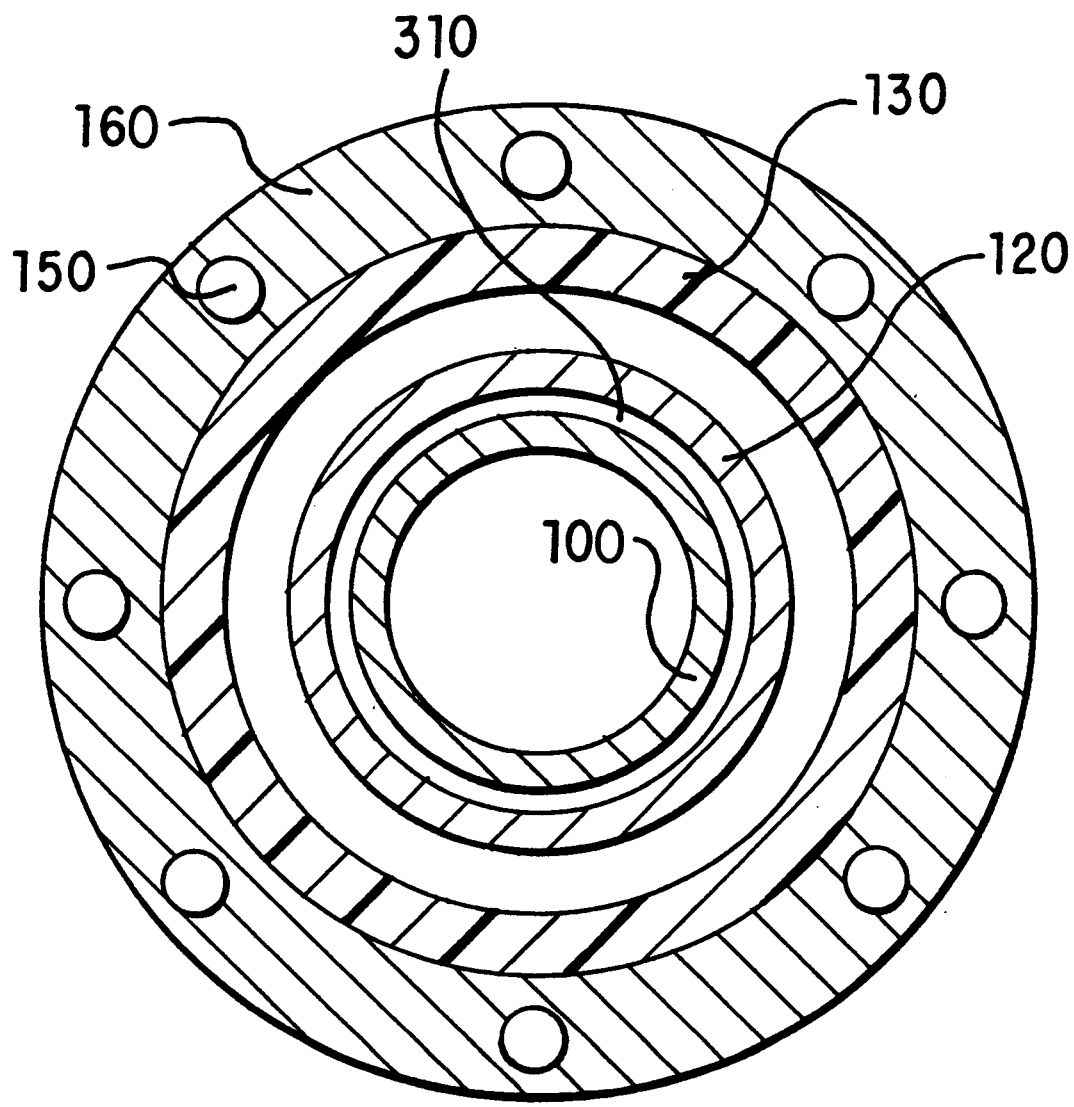
FIG. 4 shows a cross sectional top view of the spark switch.

FIG. 4 shows a cross-sectioned view of the spark gap switch. The gap 310 is disposed between the nested electrodes 100, 120.

Figure 5:
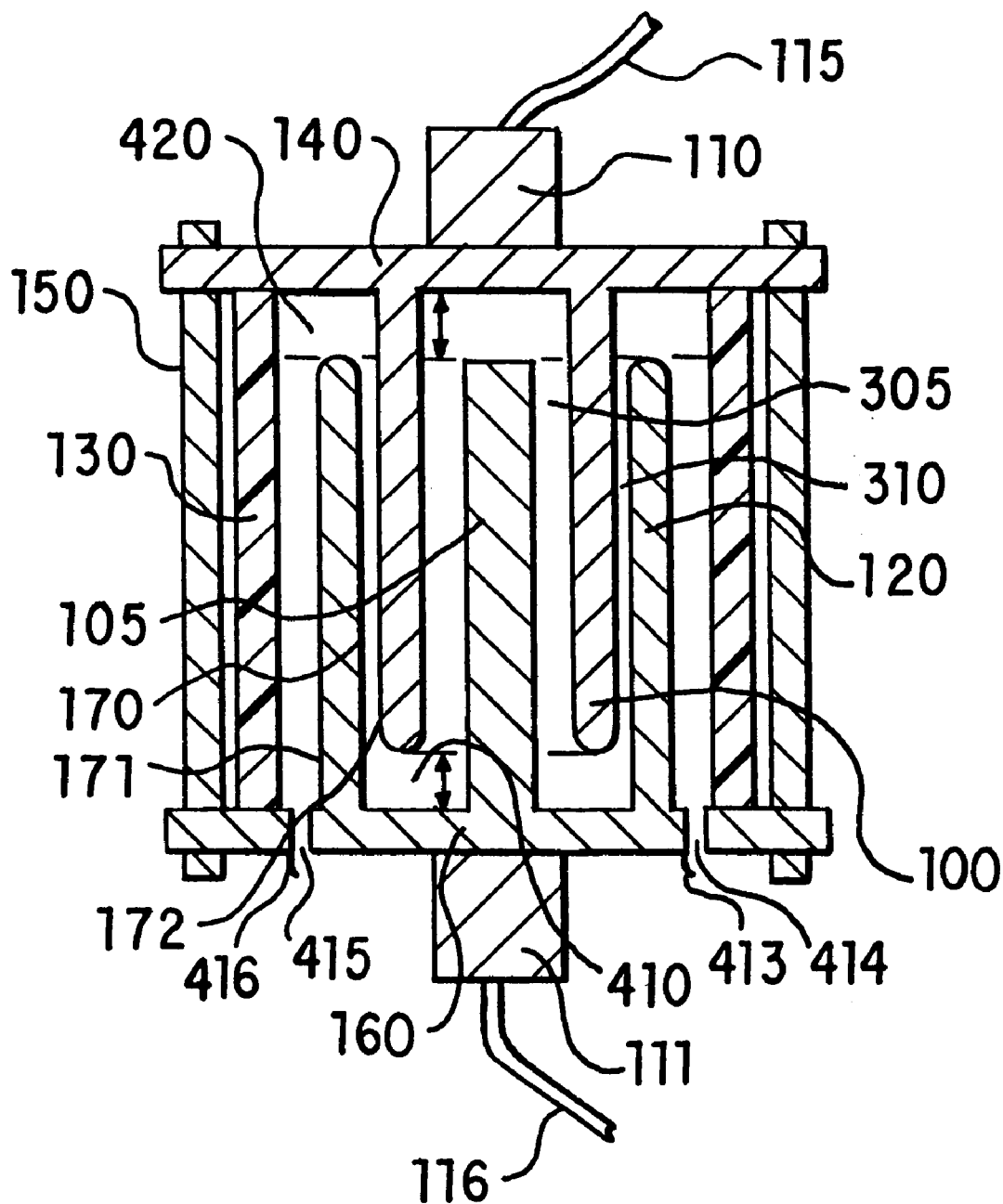
FIG. 5 shows an embodiment having multiple nested electrodes.

FIG. 5 shows that there can be multiple nested electrodes. Electrode surface 105 is connected to the outer electrode 120 and nested within the inner electrode 100. The electrode 105 and inner electrode 100 are spaced to form a second radial gap 305. This second radial gap 305 conducts current in the same manner as gap 310. This configuration provides multiple electrode surfaces for switching. These multiple electrodes 100, 105 and 120 serve to further increase exposed electrode surface area and thereby increase the operational life of the switch 10.

Figure 6:
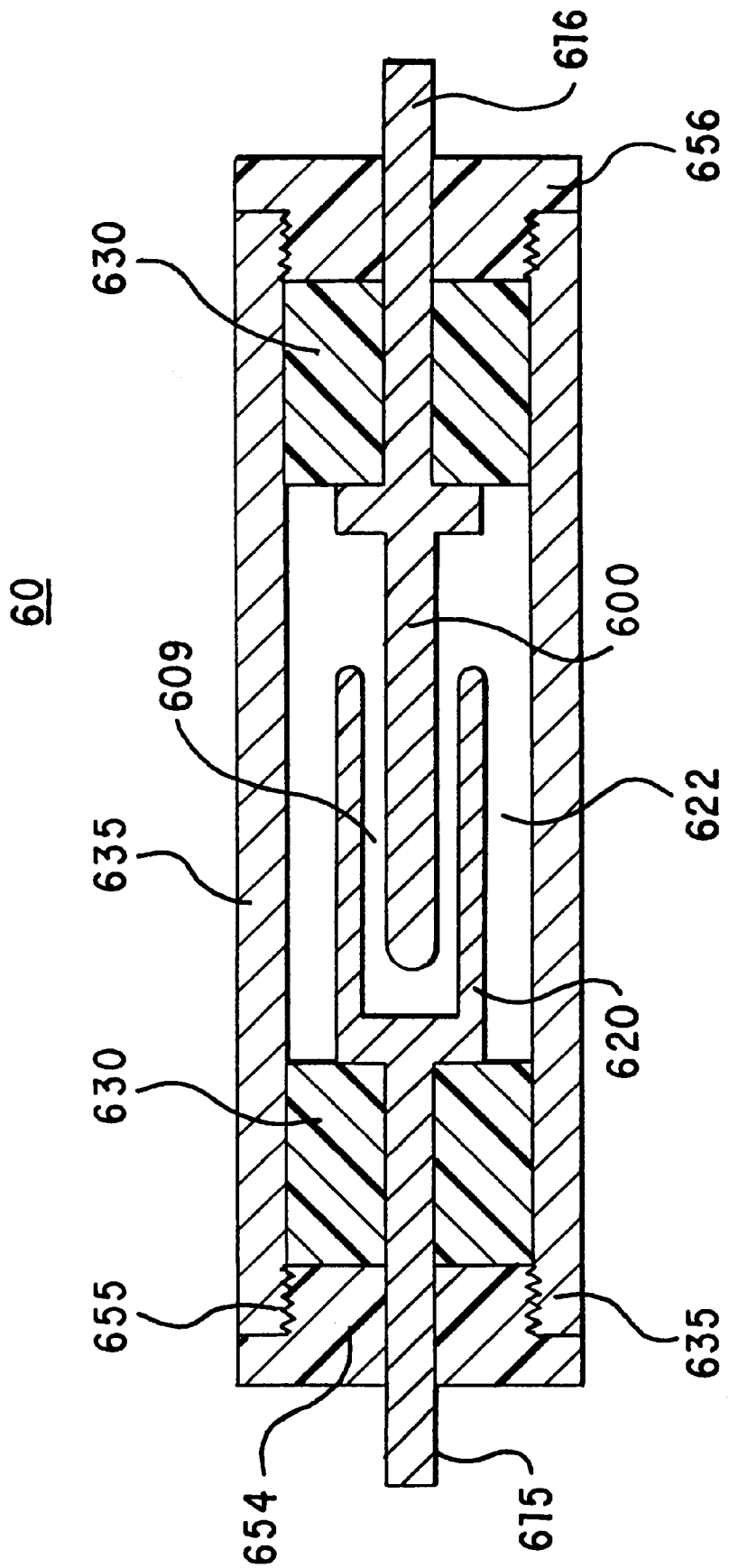
FIG. 6 shows a coaxial spark switch.

FIG. 6 shows a coaxial embodiment of the spark switch 60. This embodiment does not require endplates but rather, has a connector 615 connected to an electrical power source (not shown) and a connector 616 connected to a load (not shown). Also, there is a conducting outer shield 635, which envelops the inner 600 and outer 620 electrodes. The coaxial embodiment of FIG. 6 has a means such as threads, 655 to retain the insulator material 630. There is a gas filled pressurized region 622. A gap 609 is formed between the inner 600 and outer 620 electrodes. There are insulating retainer end plugs 654 and 656 that support the electrodes 600 and 620. These retainer end plugs 654, 656 may be made from, for example, polycarbonate.

Figure 7:
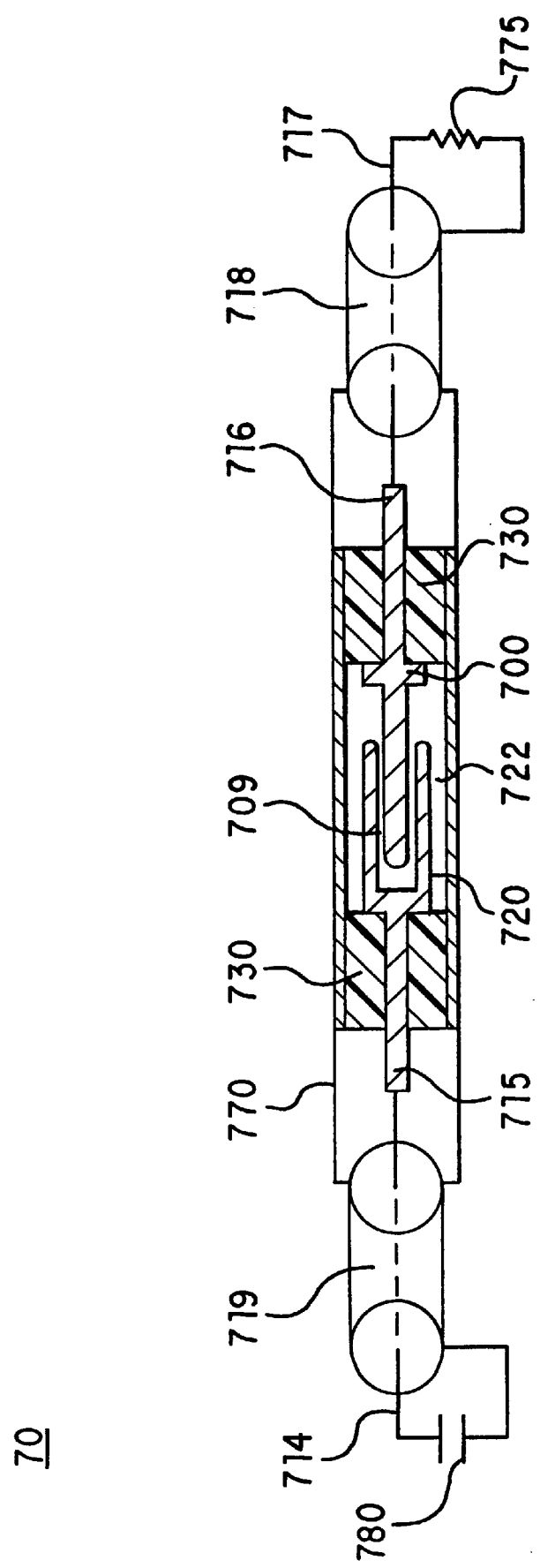
FIG. 7 shows the coaxial spark switch connected to an electrical source and to an electrical load.

FIG. 7 shows the coaxial spark switch with the electrodes 700, 720 contained inside a conducting tube 770 that provides a return path for current to pass from a load 775 back to a voltage source 780. The outer electrode 720 is connected to the voltage source 780 via a coaxial connector 719. The inner electrode 700 is connected to the load 775 via coaxial connector 718. The coaxial connectors 718, 719 include an inner conductor material 717, 714 respectively. The inner conductive material 717 connects to switch connector 716 and inner conductive material 714 connects to switch connector 715. This embodiment enables electromagnetic fields generated by the switch to be completely contained within the conducting tube 770. A pair of pieces of insulating material 730 surround portions of switch connector 715 and 716 within the conducting tube 770. This containment reduces switch inductance, lowers system inductance and reduces electromagnetic noise produced by faster switching capability.

The operating environment of the switch dictates the preferred construction materials. For example, electrode construction using a high density electrically conductive material, such as a copper tungsten matrix, (10% to 30% copper is usual with the remainder tungsten) will provide an increased operational life, but will also increase the mass of such a switch compared to the mass of a switch constructed from a less dense material. A high density material erodes more slowly.

In an environment that requires a very high pulse repetition rate, such as 1000 Hz, which puts additional heat stress on the insulating barrier, a ceramic insulating material might be preferable over a plastic insulating material. Additionally, the use of a rigid material as an insulating barrier might be preferable in some operating environments.

While the inner and outer electrodes have been depicted as cylinders, the electrodes are not limited to round dimensions but also encompass electrodes of any shape that are suitable for providing an enclosure such that a gap in which spark breakdown current may pass between the electrodes is formed.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A spark gap switch comprising:
    a first conductor;
    a second conductor;
    inner and outer electrodes disposed between said first conductor and said second conductor;
    the inner electrode comprises:
        a proximal end;
        a terminal end opposite said proximal end; and
        an outer wall; and
    the outer electrode comprises:
        a proximal end;
        a terminal end opposite said proximal end;
    said outer electrode defines a cavity for receiving at least a portion of the inner electrode, and the outer wall of the inner electrode and the cavity of the outer electrode form a radial gap; and
        a terminal gap between the proximal end of the outer electrode and the terminal end of the inner electrode, the radial gap and the terminal gap being pressurized with a dielectric gas.

2. The switch as described in claim 1, further comprising:
    an insulating material disposed around the outer electrode.

3. The switch as described in claim 2, wherein the insulating material is ceramic.

4. The switch as described in claim 2 further comprising an outer shield surrounding the inner electrode and the outer electrode.

5. The switch as described in claim 1 wherein there is a third electrode surface nested within the inner electrode forming a second radial gap between said third electrode and said inner electrode.

6. The switch described in claim 1, wherein the radial gap distance is selected based upon the desired operating breakdown voltage applied between the inner and outer electrodes.

7. The switch as described in claim 6 wherein the radial gap may be from approximately 0.001 inch to approximately 1.0 inch in size.

8. The switch as described in claim 1 wherein the first terminal gap ranges in magnitude from approximately 1 to 15 times the magnitude of the radial gap.

9. The switch as described in claim 1, further comprising:
a first end plate between the first conductor and the electrodes; and
a second end plate between the electrodes and the second conductor.

10. The switch as described in claim 9 wherein at least one of the end plates has an inlet port through which fluid may be injected into the switch to force debris out of the switch.

11. The switch as claimed in claim 10 further comprising:
an inlet port cover for covering the inlet port.

12. The switch as described in claim 10 wherein at least one of the end plates has an outlet port through which said fluid and said debris are forced out of the switch.

13. The switch as claimed in claim 12 further comprising:
an outlet port cover for covering the outlet port.

14. The switch as described in claim 9, wherein the second end plate has a radial opening for receiving a portion of the outer electrode.

15. The switch as described in claim 14, wherein the inner and outer electrodes are substantially cylindrical in shape.

16. The switch as claimed in claim 1 further comprising:
a second terminal gap formed between the terminal end portion of the outer electrode and the proximal end portion of the inner electrode;
the second terminal gap having a magnitude sufficient to prevent a short circuit situation in the switch.

17. A method for increasing the operational life of a spark gap switch comprising:
providing an outer electrode having a terminal end;
providing an inner electrode having a terminal end;
nesting the inner electrode inside a cavity of the outer electrode such that a radial gap is formed between the inner and outer electrodes for spark breakdown current and a terminal gap is formed between the proximal end of the outer electrode and the terminal end of the inner electrode, the radial gap and the terminal gap being pressurized with a dielectric gas;
wherein the terminal gap has a magnitude sufficient to prevent a short circuit situation in the switch.

18. The method as described in claim 17, further comprising:
disposing an insulating material in a sleeve-like configuration around the outer electrode.

19. The method as described in claim 18, further comprising:
nesting a third electrode within the inner electrode thereby forming a second radial gap.

20. A coaxial switch comprising:
an inner electrode;
an outer electrode having a cavity for receiving at least a portion of the inner electrode in a mating fashion, whereby a radial gap is formed between the inner electrode and outer electrodes;
a conducting tube surrounding the inner and outer electrodes the conducting tube electrically insulated from the inner and outer electrodes;
a first coaxial connector for coupling one of the electrodes to an electrical load; and
a second coaxial connector for coupling the other electrode to an electrical source.

21. A coaxial switch comprising:
an inner electrode;
an outer electrode having a cavity for receiving at least a portion of the inner electrode in a mating fashion, whereby a radial gap is formed between the inner electrode and outer electrode;
a conducting tube surrounding the inner and outer electrodes;
a first insulating material disposed around a portion of the inner electrode between the inner electrode and the conducting tube whereby the inner electrode is insulated from the conducting tube;
a second insulating material disposed around a portion of the outer electrode between the outer electrode and the conducting tube whereby the outer electrode is insulated from the conducting tube;
a first coaxial connector for coupling one of the electrodes to an electrical load; and
a second coaxial connector for coupling the other electrode to an electrical source.

* * * * *